United States Patent
Yuzawa et al.

(10) Patent No.: US 6,548,028 B1
(45) Date of Patent: Apr. 15, 2003

(54) DISCHARGE SURFACE TREATMENT DEVICE AND A DISCHARGE SURFACE TREATMENT METHOD

(75) Inventors: Takashi Yuzawa, Tokyo (JP); Akihiro Goto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/807,762

(22) PCT Filed: Nov. 13, 1998

(86) PCT No.: PCT/JP98/05109

§ 371 (c)(1),
(2), (4) Date: Apr. 18, 2001

(87) PCT Pub. No.: WO00/29154

PCT Pub. Date: May 25, 2000

(51) Int. Cl.[7] .............................................. B01J 19/08
(52) U.S. Cl. ................................. 422/186.04; 204/164
(58) Field of Search ........................ 204/164; 422/186.04

(56) References Cited

FOREIGN PATENT DOCUMENTS

| DE | 195 40 352 A1 | 4/1997 |
|---|---|---|
| DE | 197 01 170 A1 | 7/1997 |
| JP | 46-1113720 | 4/1971 |
| JP | SHO 53-72295 | 6/1978 |
| JP | SHO 57-138536 | 8/1982 |
| JP | 8-229742 | 9/1996 |
| JP | HEI 9-19829 | 1/1997 |
| JP | HEI 9-192937 | 7/1997 |

*Primary Examiner*—Kishor Mayekar
(74) *Attorney, Agent, or Firm*—Sughrue Mion, PLLC

(57) ABSTRACT

A discharge surface treatment device, which forms a modified layer on a metal surface by generating a discharge between an electrode composed of a modifying material or a material that is a source of the modifying material and metal that is a material to be surface-treated, has an arrangement in which: a plurality of electrodes, each of which is insulated from each other, are placed, each of the electrodes is connected to a power-source device exclusively used for the corresponding electrode so that each of the electrodes is supplied with a discharging pulse independently from the corresponding power-source device.

7 Claims, 4 Drawing Sheets

DISCHARGE SURFACE TREATMENT DEVICE AND A DISCHARGE SURFACE TREATMENT METHOD

This is a continuation application of PCT Patent Application PCT/JP98/05109, filed Nov. 13, 1998.

TECHNICAL FIELD

The present invention in general relates to a discharge surface treatment device and a discharge surface treatment method. More particularly, this invention relates to a discharge surface treatment device for forming a modified layer on a metal surface by generating a discharge between an electrode composed of a modifying material or a material that is a source of the modifying material and metal that is a material to be surface-treated.

BACKGROUND ART

With respect to surface treatment techniques for coating a surface of metal with a modified layer having a corrosion resistant property and an abrasion resistant property, a discharge surface treatment method has been proposed in which: an electrode, composed of a modifying material or a material that is a source of a modifying material, and metal that is a treatment subject are put in a discharging process solution, and a discharge is generated in the discharging process solution between them so that a modified coat film, such as a hard coat film formed by the electrode material or a substance such as a metal carbide generated by a reaction of the electrode material through the discharging energy, is formed on a mold face through the discharged energy. The discharge surface treatment method of this type is known. See, for example, Japanese Patent Office Application Laid-Open Nos. 9-19829 and 9-192937.

In order to achieve the above-mentioned discharge surface treatment, it is necessary to apply current pulses between the electrode and the treatment subject member. With respect to the pulse voltage to be applied between the electrode and the treatment subject member, it is necessary to apply short pulses of 2 to 8 $\mu$sec. so as to consume the electrode more easily, and also to provide a sufficient quiescent time of approximately 64 to 256 $\mu$sec. between the pulses so as to prevent the treatment subject member from being processed due to the generation of a discharge between the electrodes; thus, the pulse discharging process using such current pulses makes it possible to form an appropriate coat layer on the treatment subject surface.

In a normal discharging process, in order to improve the processing rate with pulse energy per discharge being maintained constant so as to maintain surface roughness of a processed surface, it is desirable to make a quiescent time between the applied pulses as short as possible so as to discharge continuously at high speeds; however, in the above-mentioned discharge surface treatment, in order to prevent the treatment subject member from being processed by the discharging, it is necessary to provide a sufficient quiescent time between the pulses; therefore, there is a limitation in increasing the processing rate and improving the treatment speed by shortening the quiescent time of the applied pulses.

In other words, in the discharge surface treatment, it is impossible to simply shorten the pulse-to-pulse quiescent time, when the quiescent time is shortened in the discharge surface treatment, the discharging is concentrated, and the resulting heat damages the electrode, thereby failing to form a good coat film.

As described above, in order to provide a discharge surface treatment, it is necessary to properly consume the electrode by the discharging while carrying out the process at high speeds, and also to prevent the discharging from being concentrated, the pulse waveform that is applied between the electrodes is limited, and at present, there is a limitation in achieving a method for processing a great number of parts and for processing a large area with high efficiency.

With respect to methods for carrying out a discharge surface treatment efficiently on mass-production parts and a processing face covering a large area, for example, methods have been proposed in which a plurality of simple electrodes are simultaneously used so that a number of parts are simultaneously processed using the respective electrodes and in which a processing face covering a large face is divided into sections so that a number of electrodes are used so as to simultaneously process the respective sections.

However, even in the case when a plurality of electrodes are simply used, if the power-source unit is one, an independent discharging circuit is not formed for each electrode, with the result that a discharge between poles of each electrode is not performed independently in a separated manner. Therefore, in the same manner as the discharging treatment using one electrode, a discharge occurs only at a certain point that forms the minimum point of the distance between the poles among all the electrodes, and it is not possible to generate discharges simultaneously between the respective poles of a plurality of electrodes. For this reason, in the case when pulse conditions are maintained constant, from the viewpoint of the treatment efficiency, this case is the same as the case using only one electrode.

In the case when a column-shaped simple electrode is used, a discharge between the poles is always allowed to occur in the vicinity of the center of the electrode bottom face that is most susceptible to a discharge. Accordingly, on the treatment subject face opposing the electrode bottom face, formation of a modified layer successively progresses from the center of the opposing face in the same manner, and the formation of the treated film is complete when all the opposing face has covered with the film. Therefore, upon completion, the treated face has a raised state in the center. This becomes more conspicuous when an electrode having a large diameter and a large electrode bottom area is used. As a result, the uniformity of the modified layers is decreased.

The present invention has been devised to solve the above-mentioned problems, and its objective is to provide a discharge surface treatment device and a discharge surface treatment method for the device, which can carry out a discharge surface treatment uniformly with high efficiency at high speeds, and also can carry out a multi-layered, multiplex formation of modified layers having different functions, uniformly with high efficiency at high speeds.

DISCLOSURE OF INVENTION

The present invention provides a discharge surface treatment device for forming a modified layer on a metal surface by generating a discharge between an electrode composed of a modifying material or a material that is a source of the modifying material and metal that is a material to be surface-treated, wherein a plurality of electrodes, each of which is insulated from each other, are placed, each of the electrodes is connected to a power-source device exclusively used for the corresponding electrode so that each of the electrodes is supplied with a discharging pulse independently from the corresponding power-source device.

Therefore, pulse voltages are simultaneously applied between the respective electrodes and the respective treatment subject members by using power-source devices for the respective electrodes so that pulse discharges are independently generated simultaneously or virtually simultaneously between the respective electrodes and the respective surface treatment materials; thus, it becomes possible to improve the treatment efficiency without the necessity of alternating the quiescent time between pulses.

Moreover, the present invention makes it possible to provide a discharge surface treatment device in which electrodes composed of different materials can be used.

Therefore, it is possible to carry out a multi-layered, multiplex formation of modified layers with high treatment efficiency.

Moreover, the present invention makes it possible a discharge surface treatment device having an arrangement in which the treatment subject members are provided as race members of bearings and a plurality of electrodes are aligned in an extending direction of a ball rolling face of the race members.

Consequently, it is possible to carry out the discharge surface treatment of the ball-rolling face of the race members.

Moreover, the present invention makes it possible to provide a discharge surface treatment device having an arrangement in which the treatment subject members are provided as rails, and a plurality of electrodes are aligned in the length direction of the rails.

Therefore, it becomes possible to efficiently carry out a discharge surface treatment on long rails.

Moreover, the present invention also provides a discharge surface treatment method for forming a modified layer on a metal surface by generating a discharge between an electrode composed of a modifying material or a material that is a source of the modifying material and metal that is a material to be surface-treated, which has the steps of supplying discharging pulses independently from power-source devices, each exclusively used for the corresponding electrode of a plurality of electrodes that are insulated from each other, and generating discharges on the respective electrodes, thereby making it possible to improve the efficiency in the discharge surface treatment.

Therefore, pulse voltages are simultaneously applied between the respective electrodes and the respective treatment subject members by using power-source devices for the respective electrodes so that pulse discharges are independently generated simultaneously or virtually simultaneously between the respective electrodes and the respective surface treatment materials; thus, it becomes possible to improve the treatment efficiency without the necessity of alternating the quiescent time between pulses.

Moreover, the present invention makes it possible to provide a discharge surface treatment method in which electrodes composed of different materials can be used and a multi-layered, multiplex formation of modified layers is available.

Therefore, it is possible to carry out a multi-layered, multiplex formation of modified layers with high treatment efficiency.

Moreover, the present invention makes it possible to provide a discharge surface treatment method having an arrangement in which the treatment subject members are provided as race members of bearing and a plurality of electrodes are aligned in an extending direction of a ball-rolling face of the race members.

consequently, it is possible to carry out the discharge surface treatment of the ball-rolling face of the race members.

Moreover, the present invention makes it possible to provide a discharge surface treatment method having an arrangement in which the treatment subject members are provided as rails, and a plurality of electrodes are aligned in the length direction of the rails.

Therefore, it becomes possible to efficiently carry out a discharge surface treatment on long rails.

BEST MODE FOR CARRYING OUT THE INVENTION

Figure 1:
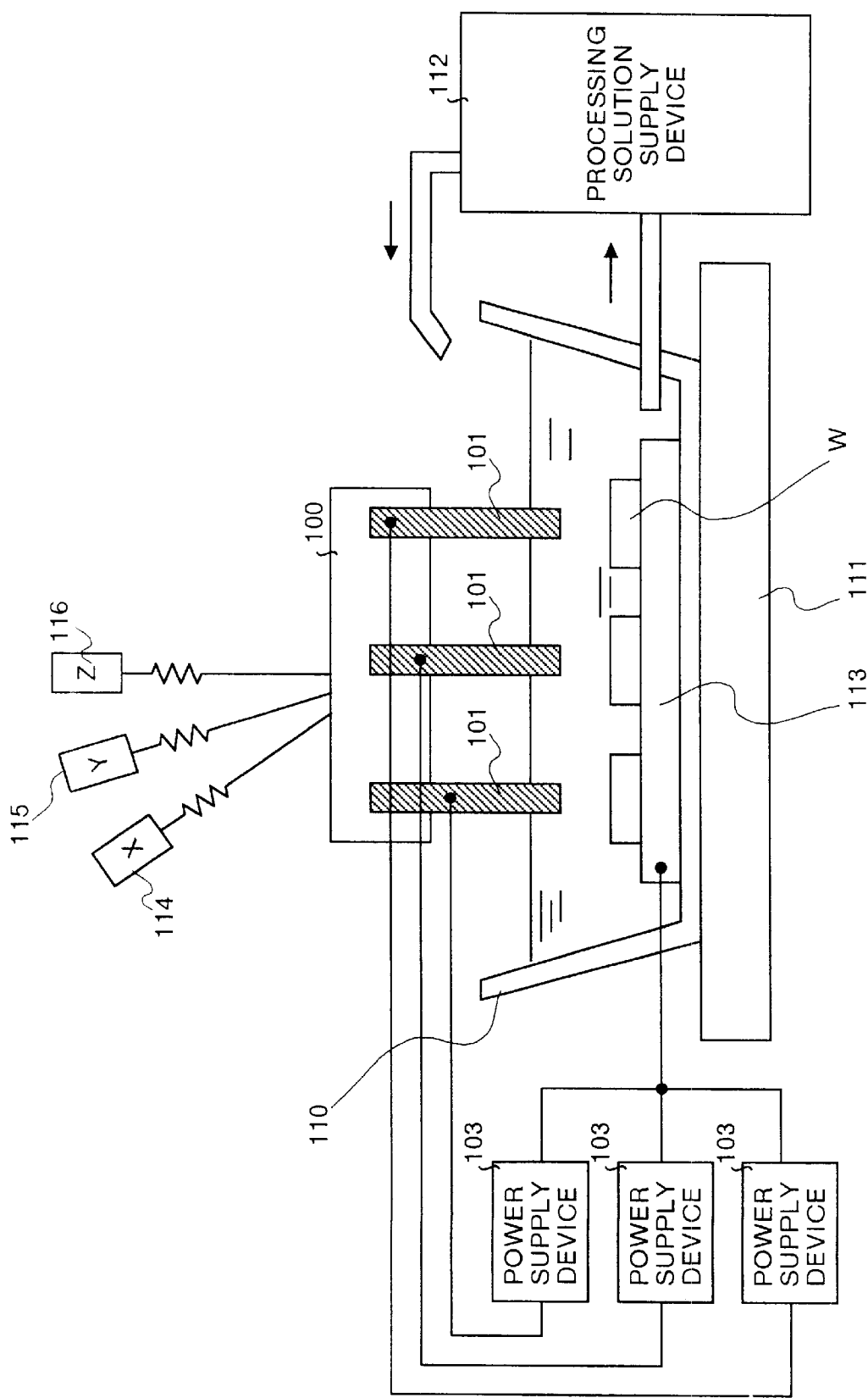
FIG. 1 is a schematic drawing that shows a first embodiment of a discharge surface treatment device in accordance with the present invention.

Referring to attached drawings, the following description will discuss preferred embodiments of the present invention. FIG. 1 shows a first embodiment of a discharge surface treatment device in accordance with the present invention. In this discharge surface treatment device, a plurality of electrodes (three are shown in the figure) 101, made of, for example, a Ti-type material or a $TiH_2$-type material, are attached to an electrode holder 100 in parallel with each other in a manner so as to be electrically insulated from each other. An exclusively-used power-supply device 103 for supplying a discharging pulse independently to each of the electrodes 101 is connected to each of the electrodes 101.

With this arrangement, the same number (three) of power-supply devices 103 as the electrodes 101 are independently attached to the respective electrodes 101 so that pulse voltages are independently supplied to the respective electrodes 101 in the same synchronized timing with each other.

A processing vessel 110 for storing a processing solution is secured onto a fixing base 111, and the processing solution is supplied by a processing solution supplying device 112 in a cyclic manner. Inside the processing vessel 110 is placed a working base 113 on which a treatment subject member W is placed.

The electrode holder 100, though illustrated in a simplified manner in the Figure, is connected to X, Y, Z-axis driving means 114, 115, 116 having a generally-used axis-transporting system, and these X, Y, Z-axis driving means 114, 115 and 116 allow the treatment subject member W on the working base 113 to relatively shift in the X-axis direction, the Y-axis direction and the Z-axis direction.

In the discharge surface treatment device having the above-mentioned arrangement, the same number of the treatment subject members W as the electrodes 101 are set to the corresponding electrodes 101, and in an oil-type processing solution containing much carbon, pulse voltages are applied from the respective power-supply devices 103 for the respective electrodes 101 between the electrodes 101 made of a Ti-type material, etc. and the respective treatment subject members W, that is, between the respective electrodes 101 and the respective treatment subject members W.

With this arrangement, under the pole-to-pole servo controlling process, pulse discharging occurs simultaneously or virtually simultaneously between each electrode 101 and each treatment subject member W in an independent manner. Here, in order to generate the discharging independently for each electrode 101, it is necessary to keep the respective electrodes 101 in an electrically insulated state.

The power-supply device 103 used in this case may be a normal discharge processing power supply, and with respect to the discharge processing conditions, it is preferable to provide a condition with a comparatively small discharging energy, such as a Ti electrode having a negative polar capacitor discharge. During the processing, Ti, which is an electrode material, is allowed to float in the processing solution through thermal energy generated by the discharging, and to adhere to the surface of the treatment subject member W. Simultaneously, carbon contained in the oil-type processing solution is decomposed by discharging energy so that it is separated from the processing liquid. Through a chemical reaction between the decomposed carbon and Ti, TiC, carbide of Ti, is formed; thus, hard coat film of the carbide TiC is formed on the surface of the treatment subject member W.

As described above, during the pole-to-pole servo operation, pulse discharging occurs simultaneously or virtually simultaneously between each electrode 101 and each treatment subject member W in an independent manner; therefore, it is possible to increase the processing efficiency without changing the quiescent time between pulses, and consequently to simultaneously process a plurality of treatment subject members W.

Figure 2:
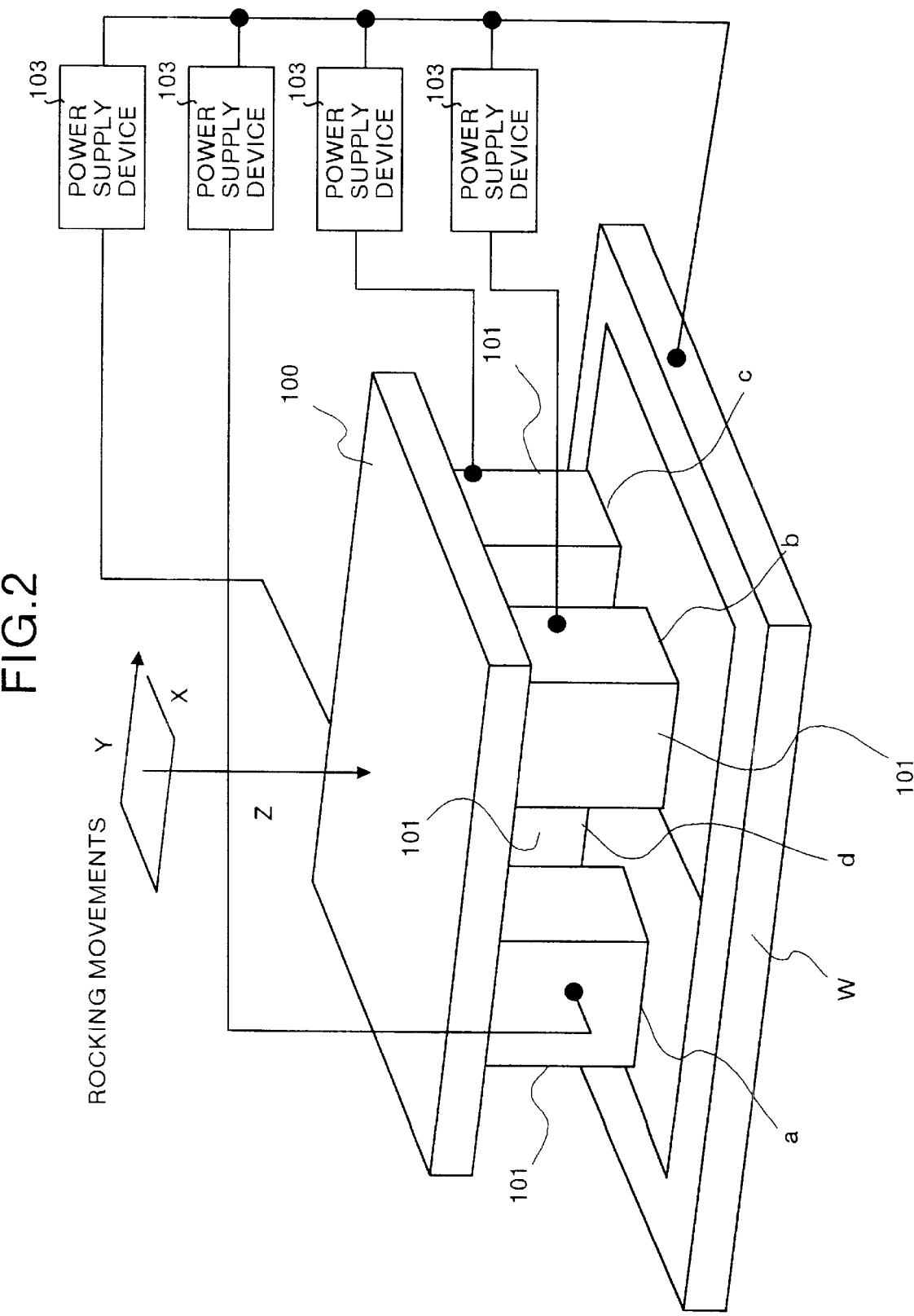
FIG. 2 is a schematic drawing that shows a second embodiment of the discharge surface treatment device in accordance with the present invention.

FIG. 2 shows a second embodiment of a discharge surface treatment device in accordance with the present invention. In FIG. 2, those members that correspond to those described in FIG. 1 are indicated by the same reference numbers attached in FIG. 1, and the description thereof is omitted.

In this discharge surface treatment device, four electrodes 101, made of, for example, a Ti-type material, etc. are attached to an electrode holder 100 in parallel with each other in a manner so as to be electrically insulated from each other. An exclusively-used power-supply device 103 for supplying a discharging pulse independently to each of the electrodes 101 is connected to each of the electrodes 101.

With this arrangement, the same number (four) of power-supply devices 103 as the electrodes 101 are independently attached to the respective electrodes 101 so that pulse voltages are independently supplied to the four electrodes 101 in the same synchronized timing with each other.

Consequently, the four electrodes 101, which correspond to respective separated areas a, b, c and d formed by dividing a processing face covering a large area, simultaneously carry out surface treatments on the respective areas; thus, different from a conventional discharging duplicator using a single power supply, a plurality of power supplies are used so that discharging is generated almost simultaneously for each of the electrodes 101, thereby making it possible to improve the treatment efficiency in accordance with the number of the power supplies 103.

Here, the respective electrodes 101 are fixed to the holder 100 with a constant distance from each other so as to ensure an insulating state from each other; therefore, in the case when the process is carried out by using only the Z-axis transfer, since the treatment subject face corresponding to the gaps between the electrodes 101 is not subjected to the surface treatment, the discharge surface treatment is carried out while the entire holder is being rocked in the X-Y axis direction.

As described above, by using the divided four electrodes 101, discharging is generated almost simultaneously at the respective separated areas a, b, c and d formed by dividing a processing face covering a large area, thereby making it possible to provide a high-speed treatment. Moreover, different from the application of an electrode covering a large bottom area such as an area integrally including the four electrodes 101, it becomes possible to improve the uniformity of the treated film thickness.

Figure 3:
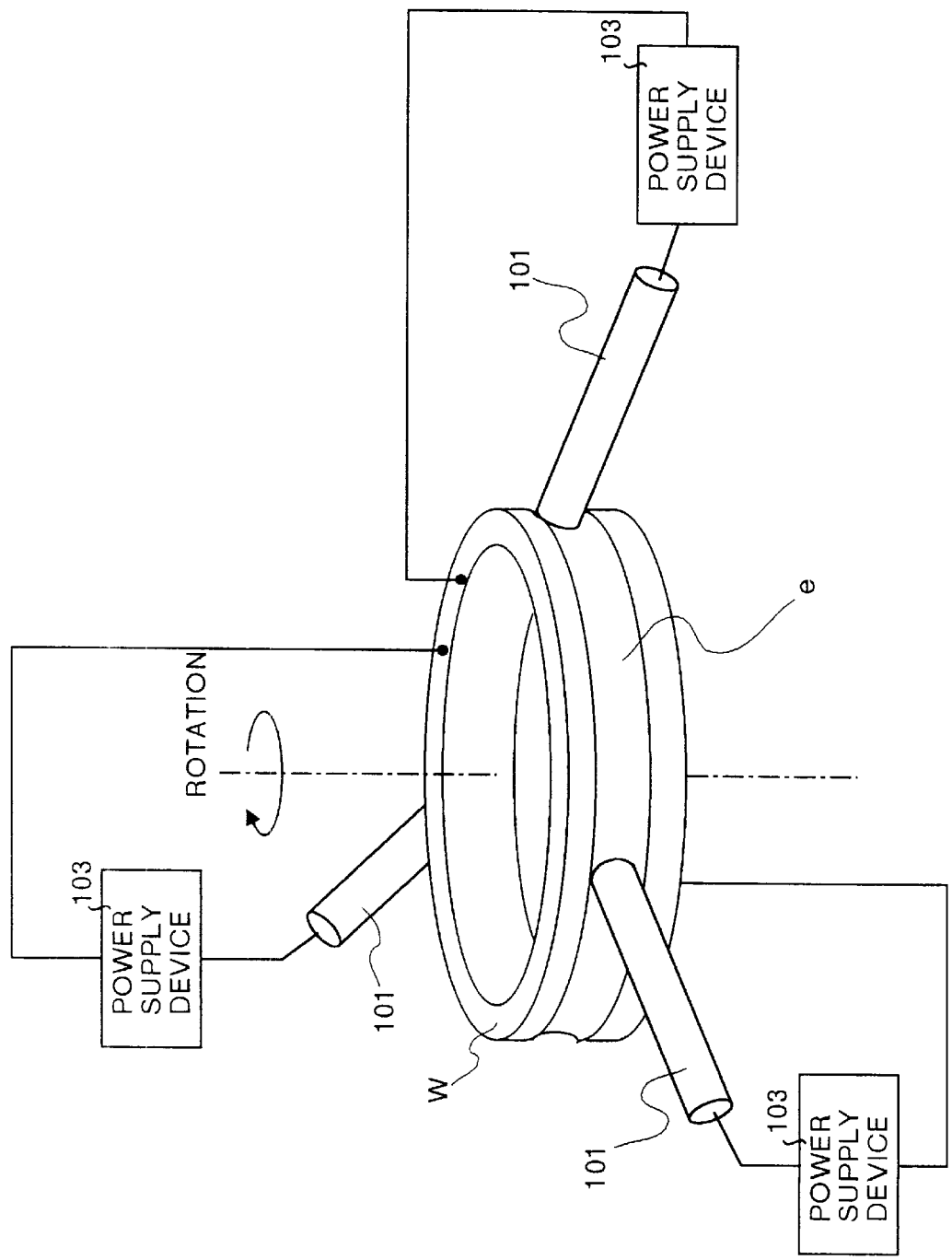
FIG. 3 is a schematic drawing that shows modified example 1 of the discharge surface treatment device in accordance with the present invention.

FIG. 3 shows modified example 1 for forming a modified layer on a ball-rolling of a race member for ball bearing by using the discharge surface treatment device of the present invention.

In general, in the process for forming a modified layer on a ball-rolling face of a race member, a simple-shape electrode is used, and the process is carried out while the electrode is being shifted in a manner so as to scan the treatment subject face. In the case when the surface treatment is carried out on mass products, such as race members for ball bearings, it is very important to control its task time, and it is necessary to increase the thickness of the modified layer per processing time of the surface treatment, that is, per constant processing task time, as great as possible.

In order to meet this demand, in a solution, a plurality of electrodes 101 are aligned face to face with the ball-rolling face e that is a treatment subject face of a race member W, and independent power supplies 103 are respectively connected to the respective electrodes 101 so that pulse voltages are supplied to the respective electrodes 101 from the power supplies 103 simultaneously in a separated manner. In this case, the electrodes 101 are aligned in the extending direction of the ball-rolling face e of the race member W (in the circumferential direction of the race member W).

With this arrangement, discharging is generated almost simultaneously at each of the electrodes 101, thereby making it possible to improve the treatment efficiency in a multiple manner as the number of the electrodes 101 increases.

Since the peak of applied pulses in the discharge surface treatment determines the surface roughness of the treated surface, a small-size power supply, exclusively used for the surface treatment, is prepared for each of the electrodes 101.

Moreover, in this case, a multi-layered coat film can be formed efficiently by changing the materials of the respective electrodes 101.

For example, one electrode 101 may be provided as a Ti (titanium)-based electrode and the other electrode may be provided as an Ag (silver)-based electrode so that after formation of a TiC coat film k, a silver coat film is formed. The TiC coat film is a hard coat film and the silver coat film is a coat film having a lubricating property; therefore, it is possible to form a coat film having a lubricating property on a hard coat film.

Moreover, the above-mentioned process is not intended to be limited to the inner race, and is also applied to the outer race, in the same manner.

Figure 4:
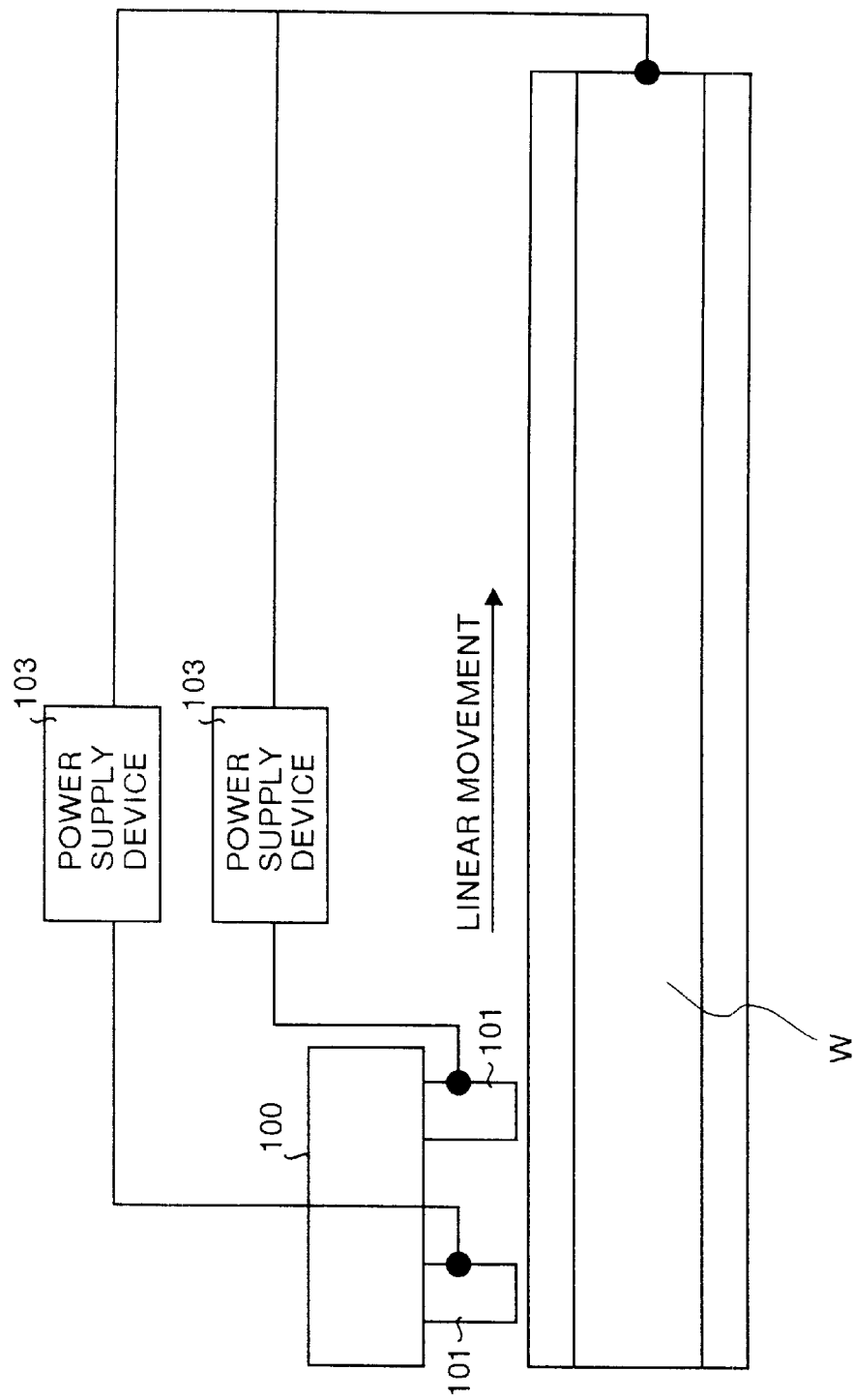
FIG. 4 is a schematic drawing that shows modified example 2 of the discharge surface treatment device in accordance with the present invention.

FIG. 4 shows modified example 2 for forming a modified layer on a guide face of a rail by using the discharge surface treatment device of the present invention.

A plurality of electrodes 101 are aligned in an electrode holder 100 in the length direction of a rail W that is a treatment subject face. The respective electrodes 101 are electrically insulated from each other, and independent power supplies 103 are respectively connected to the respective electrodes 101 so that pulse voltages are supplied to the respective electrodes 101 from the power supplies 103 in a separated manner.

Thus, the same number of the power supplies 103 as the electrodes 101 are placed in a separated manner from each other, and pulse voltages are supplied to the respective electrodes 101 simultaneously from the power supplies 103 in a separated manner.

In this case, the rail W generally includes all linear-shaped parts such as a linear guide for machining devices and rails for rail roads.

Upon carrying out a discharge surface treatment on a rail W, the electrode holder 100 is shifted in the length direction of the rail W, and pulse voltages are supplied to the respective electrodes 101 simultaneously from the power supplies 103 in a separated manner so that, in a solution, discharging is generated between the respective electrodes 101 and the rail W.

In this case, the electrodes 101 may be formed by the same material or different kinds of materials. In the case of the same material, a modified layer having a desired thickness can be formed efficiently at high rates, and in the case of different kinds of materials, a multi-layered coat film can be formed efficiently.

INDUSTRIAL APPLICABILITY

As described above, the discharge surface treatment device and discharge surface treatment method of the present invention can be applied to a multiple processing operation and a large-area processing operation for parts.

What is claimed is:

1. A discharge surface treatment device for forming a modified layer on a metal surface of a treatment subject member by generating a discharge between an electrode composed of a first modifying material or a first material that is a source of the first modifying material and the metal surface of the treatment subject member, said device comprising:

a plurality of electrodes, each of which is insulated from each other; and a plurality of power-source devices, each of which is independently connected to a corresponding one of the electrodes, and exclusively used for the corresponding electrode so that each of the electrodes is supplied with a discharging pulse independently from the corresponding power-source device, wherein at least one of the electrodes is composed of a second modifying material or a second material that is a source of the second modifying material.

2. A discharge surface treatment device for forming a modified layer on a metal surface of a treatment subject member by generating a discharge between an electrode composed of a modifying material or a material that is a source of the modifying material and the metal surface of the treatment subject member, said device comprising:

a plurality of electrodes, each of which is insulated from each other; and a plurality of power-source devices, each of which is independently connected to a corresponding one of the electrodes, and exclusively used for the corresponding electrode so that each of the electrodes is supplied with a discharging pulse independently from the corresponding power-source device, wherein a plurality of treatment subject members are provided as race members of bearings and the electrodes are aligned in an extending direction of a ball-rolling face of each race member.

3. A discharge surface treatment device for forming a modified layer on a metal surface of a treatment subject member by generating a discharge between an electrode composed of a modifying material or a material that is a source of the modifying material and the metal surface of the treatment subject member, said device comprising:

a plurality of electrodes, each of which is insulated from each other; and a plurality of power-source devices, each of which is independently connected to a corresponding one of the electrodes, and exclusively used for the corresponding electrode so that each of the electrodes is supplied with a discharging pulse independently from the corresponding power-source device, wherein the treatment subject member comprises a rail, and the electrodes are aligned in the length direction of the rail.

4. A discharge surface treatment method for forming a modified layer on a metal surface of a treatment subject member by generating a discharge between an electrode composed of a first modifying material or a first material that is a source of the first modifying material and the metal surface of the treatment subject member, the method comprising the steps of:

supplying discharging pulses independently from a plurality of power-source devices to a plurality of electrodes which are insulated from each other, wherein each of the power-source devices is exclusively used for a corresponding one of the electrodes; and generating discharges on the respective electrodes to form a modified layer on a metal surface of a treatment subject member.

5. The discharge surface treatment method according to claim 4, wherein at least one of the electrodes is composed of a second modifying material or a second material that is a source of the second modifying material, so that a multi-layered, multiplex formation of modified layers is formed on the metal surface of the treatment subject member.

6. The discharge surface treatment method according to claim 4, wherein a plurality of treatment subject members are provided as race members of bearings and the electrodes are aligned in an extending direction of a ball-rolling face of each race member.

7. The discharge surface treatment method according to claim 4, wherein a plurality treatment subject members are provided as rails, and the electrodes are aligned in the length direction of each rail.

* * * * *